Figure 1:
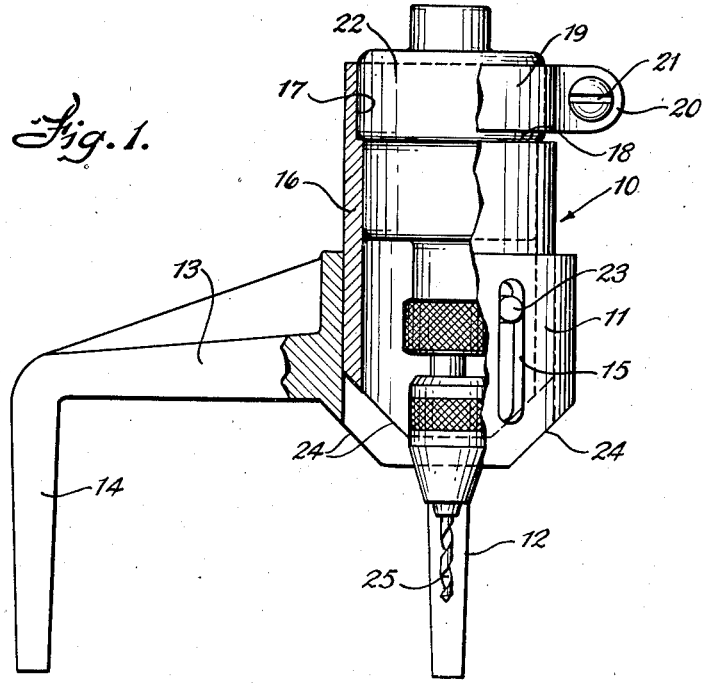

Aug. 31, 1948.　　　S. F. DUDRICK　　　2,448,361
TOOL GUIDE

Filed March 11, 1946　　　2 Sheets-Sheet 1

Inventor
Stanley F. Dudrick.

By Clarence A. O'Brien
and Harvey B. Jacobson
Attorneys

Aug. 31, 1948. S. F. DUDRICK 2,448,361
TOOL GUIDE
Filed March 11, 1946 2 Sheets-Sheet 2
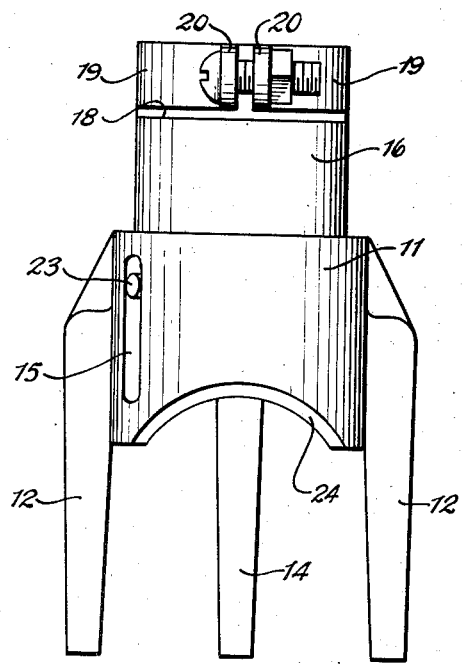
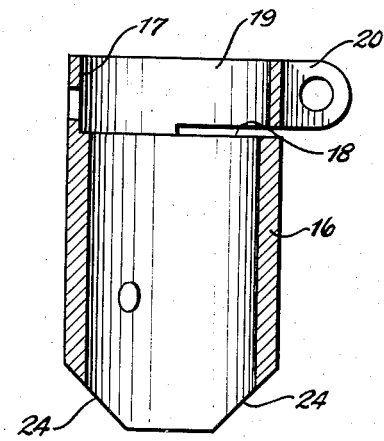
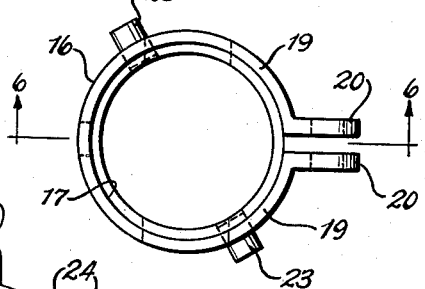
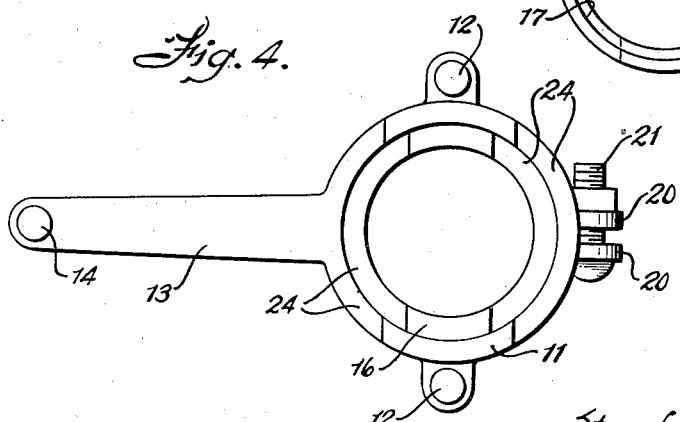
Inventor
Stanley F. Dudrick.
By Clarence A. O'Brien
and Harvey B. Jacobson
Attorneys Patented Aug. 31, 1948

2,448,361

UNITED STATES PATENT OFFICE 2,448,361

TOOL GUIDE

Stanley F. Dudrick, Nanticoke, Pa.

Application March 11, 1946, Serial No. 653,449

1 Claims. (Cl. 77—55)

1

This invention relates to a tool guide and has for its primary object to support a tool such as a drill in spaced relation to a workpiece, and perpendicular thereto to insure that holes drilled in the workpiece will be perpendicular to the working surface thereof.

Another object is to facilitate the supporting of tools of different types, such as rotary or vibratory drills, taps and the like, in proper position with relation to a workpiece.

The above and other objects may be attained by employing this invention which embodies among its features a tubular guide, a tool carriage movable axially of said guide, and legs on the guide for holding it spaced from, and its axis at a fixed angle with relation to a workpiece.

Other features include a stop for limiting the length of movement of the carriage in the guide, and clamp means carried by the carriage for clamping a tool in position therein.

Figure 2:
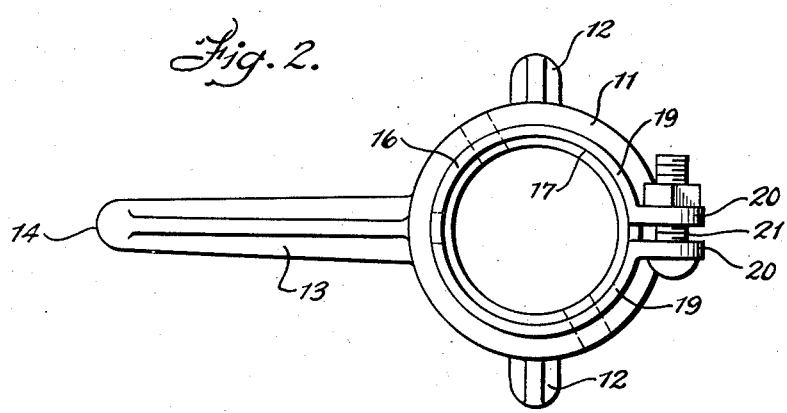

In the drawings:

Figure 1 is a side view partially in section of a tool holder and guide embodying the features of this invention, Figure 2 is a top plan view of the tool holder and guide illustrated in Figure 1, Figure 3 is a front view in elevation of Figure 2, Figure 4 is a bottom plan view of Figure 1, Figure 5 is a plan view of the carriage, and Figure 6 is a transverse sectional view taken substantially along the line 6—6 of Figure 5.

Referring to the drawings in detail, my improved tool guide and holder designated generally 10 comprises a tubular guide member 11 having formed integrally therewith a pair of depending legs 12 and a rearwardly extending tail piece 13 carrying at its rear end a depending leg 14, and the legs 12 and 14 are of such length that the longitudinal axis of the tubular guide 11 will be perpendicular to a work surface upon which the lower ends of the legs 12 and 14 rest. The tubular body 11 is formed with a longitudinal slot 15, the purpose of which will be more fully hereinafter explained.

Slidably fitted within the tubular guide 11 is a sleeve 16 forming a carriage having a recess 17 adjacent its upper end, and a transverse slot 18 forming a pair of clamp arms 19 terminating in outwardly extending ears 20 which are pierced to receive a clamping bolt 21 by means of which the frame 22 of a drill or the like may be secured in the carriage. Carried at diametrically opposite points by the carriage 16 are radially extending lugs 23 which are adapted to be received in the slots 15 to prevent the carriage from rotating with relation to the tubular body 11 and also to limit the longitudinal movement of the carriage 16 through the tubular guide 11.

The lower ends of the tubular guide 11 and the carriage 16 are relieved as at 24 to improve visibility when the device is in operation.

In use it will be understood that a tool such as a drill frame 22 is clamped in the carriage by tightening the bolt 21 so as to draw the clamp arms 19 together about the frame of the tool. The bit 25 of the tool will then be axially disposed with relation to the guide and its axis will be parallel to the axes of the legs 12 and 14. Since the ends of the legs 12 and 14 are so disposed as to cause the axis of the tool guide to lie perpendicular to a workpiece when the lower ends of the legs are in position thereon it will be obvious that the bit 25 of the tool will also be perpendicular to the working surface. By lifting the tool as suggested in Figure 1 it is obvious that it may be placed directly over the spot to be drilled and upon setting the drill bit 25 into operation and moving the carriage 16 axially of the guide 11, the drill bit 25 will be advanced into the work, to form a perpendicular opening therein. Obviously, should the leg 14, for instance, be shorter than the legs 12, the drill bit 25 may be caused to enter the workpiece so that the axis of the opening made therein will lie at an angle to the surface of the work, according to the angle for which the tool is designed. It is therefore obvious that any number of openings may be drilled in a workpiece with the knowledge that the axes thereof will be parallel. Since in most instances it is desirable to have the openings drilled in a piece of work perpendicular to the working surface thereof, the device in its preferred form will be as illustrated in the accompanying drawing. It is evident that by the use of a device of this character a large number of openings may be drilled in a workpiece with the knowledge that the axes thereof will all lie parallel one to the other.

While in the foregoing there has been shown and described the preferred embodiment of this invention it is to be understood that minor changes in the details of construction, combination, and arrangement of parts may be resorted to without departing from the spirit and scope of the invention as claimed.

I claim:

A tool guide and support comprising a tubular guide body, a pair of diametrically opposite spaced parallel legs extending downwardly from the lower edge of the body in spaced substantially parallel relation to the vertical axis of the body, an arm extending radially from the body near its lower end, said arm lying in a plane which extends vertically through the body midway between the first-mentioned legs, a leg depending from the arm near the end remote from the body, said leg lying along an axis which lies parallel with the vertical axis of the body, said leg cooperating with the first-mentioned legs in supporting the body in spaced relation and perpendicular to a work piece, a tool embracing carriage slidable axially in the guide body, means at the upper end of the carriage to clamp a tool therein and the lower edge of the body being relieved between the legs to render visible the point of a tool clamped in the carriage.

STANLEY F. DUDRICK.

REFERENCES CITED

The following references are of record in the file of this patent:

UNITED STATES PATENTS

| Number | Name | Date |
| --- | --- | --- |
| 2,175,546 | Woods | Oct. 10, 1939 |
| 2,335,614 | Spievak | Nov. 30, 1943 |

FOREIGN PATENTS

| Number | Country | Date |
| --- | --- | --- |
| 134,642 | Germany | Sept. 20, 1902 |